(12) United States Patent
Cross et al.

(10) Patent No.: US 7,984,488 B2
(45) Date of Patent: Jul. 19, 2011

(54) CREDENTIAL ROAMING IN ELECTRONIC COMPUTING SYSTEMS

(75) Inventors: David B. Cross, Redmond, WA (US); Xiaohong Su, Issaquah, WA (US); Hao Zhuang, Sammamish, WA (US); Philip J. Hallin, Port Townsend, WA (US)

(73) Assignee: Microsoft Corporation, Redmond, WA (US)

( * ) Notice: Subject to any disclaimer, the term of this patent is extended or adjusted under 35 U.S.C. 154(b) by 1141 days.

(21) Appl. No.: 10/821,603

(22) Filed: Apr. 9, 2004

(65) Prior Publication Data

US 2005/0257072 A1 Nov. 17, 2005

(51) Int. Cl.
*G06F 7/20* (2006.01)
*G06F 17/30* (2006.01)

(52) U.S. Cl. .............. 726/6; 726/18; 707/613; 707/614; 707/615; 707/616; 707/617; 707/618; 707/619

(58) Field of Classification Search ....... 726/6; 707/613
See application file for complete search history.

(56) References Cited

U.S. PATENT DOCUMENTS

| | | | |
|---|---|---|---|
| 5,341,426 A | | 8/1994 | Barney et al. |
| 5,657,458 A * | | 8/1997 | Kondo et al. ............... 710/118 |
| 5,689,706 A * | | 11/1997 | Rao et al. ................. 707/201 |
| 5,774,545 A * | | 6/1998 | Raghavachari ............ 713/189 |
| 5,838,903 A * | | 11/1998 | Blakely et al. ................ 726/5 |
| 5,887,065 A | | 3/1999 | Audebert |
| 5,892,828 A | | 4/1999 | Perlman |
| 5,916,307 A * | | 6/1999 | Piskiel et al. ............... 719/314 |
| 6,014,669 A * | | 1/2000 | Slaughter et al. ............... 1/1 |
| 6,144,959 A | | 11/2000 | Anderson et al. |
| 6,151,643 A * | | 11/2000 | Cheng et al. .................... 710/36 |
| 6,351,468 B1 | | 2/2002 | LaRowe, Jr. et al. |
| 6,460,051 B1 * | | 10/2002 | LaRue et al. .................. 707/201 |
| 6,490,666 B1 * | | 12/2002 | Cabrera et al. ............... 711/161 |
| 6,490,680 B1 | | 12/2002 | Scheidt et al. |
| 6,510,522 B1 * | | 1/2003 | Heinrich et al. ............... 726/34 |
| 6,560,655 B1 * | | 5/2003 | Grambihler et al. .......... 709/248 |
| 6,732,277 B1 * | | 5/2004 | Vandergeest et al. ........... 726/19 |
| 6,986,039 B1 * | | 1/2006 | Leah et al. .................... 713/155 |
| 6,993,653 B1 | | 1/2006 | Guski et al. |
| 7,010,683 B2 | | 3/2006 | Corella |
| 7,290,133 B1 | | 10/2007 | Montgomery |
| 7,328,344 B2 | | 2/2008 | Chang |

(Continued)

FOREIGN PATENT DOCUMENTS

CA 2324732 A1 4/2002

(Continued)

OTHER PUBLICATIONS

Brovick et al. "Windows 2000 Active Directory", New Riders Publishing, 2000, Chapter 10, 8 Pages.*

(Continued)

*Primary Examiner* — Matthew T Henning
(74) *Attorney, Agent, or Firm* — Lee & Hayes, PLLC

(57) ABSTRACT

An exemplary system enabling credential roaming among a plurality of different computing devices may include an event handler to receive event notifications such as, e.g., a client logon. The event handler may invoke a management service in response to receiving an event notification. The management service may include a synchronizing module to synchronize a user's credentials with a remote directory service, such as, e.g., Active Directory, so that the user's credentials are available from any of a number of different computing devices.

39 Claims, 7 Drawing Sheets

U.S. PATENT DOCUMENTS

| | | | |
|---|---|---|---|
| 7,363,325 B2 * | 4/2008 | Yianilos et al. | 707/201 |
| 2002/0027992 A1 | 3/2002 | Matsuyama et al. | |
| 2002/0029214 A1 * | 3/2002 | Yianilos et al. | 707/7 |
| 2002/0087883 A1 | 7/2002 | Wohlgemuth et al. | |
| 2002/0107809 A1 | 8/2002 | Biddle et al. | |
| 2002/0112083 A1 | 8/2002 | Joshi et al. | |
| 2002/0116647 A1 | 8/2002 | Mont et al. | |
| 2002/0157089 A1 | 10/2002 | Patel et al. | |
| 2002/0178271 A1 | 11/2002 | Graham et al. | |
| 2003/0018785 A1 * | 1/2003 | Eshel et al. | 709/226 |
| 2003/0084171 A1 | 5/2003 | de Jong et al. | |
| 2003/0105957 A1 | 6/2003 | Brabson | |
| 2003/0110376 A1 | 6/2003 | Wiener et al. | |
| 2003/0163686 A1 | 8/2003 | Ward et al. | |
| 2003/0167405 A1 | 9/2003 | Freund et al. | |
| 2004/0073787 A1 | 4/2004 | Ban et al. | |
| 2004/0123138 A1 | 6/2004 | Le Saint | |
| 2004/0260953 A1 * | 12/2004 | Jamieson et al. | 713/202 |
| 2005/0044089 A1 * | 2/2005 | Wu et al. | 707/100 |
| 2005/0171872 A1 * | 8/2005 | Burch et al. | 705/29 |
| 2006/0069913 A1 | 3/2006 | Valente | |

FOREIGN PATENT DOCUMENTS

| | | |
|---|---|---|
| CN | 1373423 A | 10/2002 |
| EP | 0 706 291 | 4/1996 |
| EP | 1560100 | 8/2005 |
| JP | 4271462 (A) | 9/1992 |
| JP | 4271465 (A) | 9/1992 |
| JP | 2000082045 (A) | 3/2000 |
| JP | 2001109668 (A) | 4/2001 |
| RU | 2148856 C1 | 5/2000 |
| WO | WO 96/08912 | 3/1996 |
| WO | WO 98/43426 | 10/1998 |
| WO | WO0052557 A1 | 9/2000 |
| WO | WO0152023 A2 | 7/2001 |

OTHER PUBLICATIONS

EBU Project Group B/CA "Functional Model of a Conditional Access System" EVU Technical REview, Winter 1955, pp. 64-77.

"Entrust Authority (tm) Roaming Server" Published on the internet at http://www.entrust.com/authority/roaming/datasheet.htm at least as early as Apr. 2004, 2 pages.

"Managed PKI: Roaming" Published on the internet at http://www.verisign.com/products/roaming/index.html at least as early as Apr. 2004 copyright 1995 to 2004, 2 pages.

Gupta, et al., "Security Characteristics of Cryptographic Mobility Solutions" retrieved on May 29, 2006 at <<http:www.cs.dartmouth.edu/{pki02/Gupta/paper.pdf>> Jul. 30, 2002, pp. 117-126.

Gustafson, et al., "Securely Available Credentials—Credential Server Framework", IETF Standard-Working-Draft, Internet Engineering Rack Force, vol. sacred, No. 7, Nov. 2003, pp. 1-22.

"Novell SecureLogin", retrieved on Jun. 29, 2006 at <<http://www.novell.com/documentation/securelogin30/pdfdoc/nsladm304/nsladm304.pdf>> Oct. 31, 2003, Section 1, pp. 1-198.

"Partial containment structure for integration of distributed computing environment and local registries", IBM Technical disclosure bulletin, IBM Corp. New York, US, vol. 38, No. 9, Sep. 1, 1995, pp. 535-538.

"v-Go Single-Sign on by Passlogix" retrieved on May 29, 2006 at <<http://www.biometricsdirect.com/Documents/brochure-SSO.pdf>> Passlogix, Apr. 8, 2003, 7 pages.

Christoffel, Jurgen, "Bal—A Tool to Synchronize Document Collections Between Computers", Proceedings of the Eleventh Systems Administration Conference (LISA 97), San Diego, California, Oct. 1997, pp. 85-88.

Allen, et al., "Single Sign-ON: A Set of Scribe Notes Describing the Operation of Single Sign-ON After a Lecture Given by Almerindo Graziano", retrieved from the Internet on Jan. 21, 2011 at http://www.besnard.org/sso.pdf, 3 pages.

The Chinese Office Action mailed Mar. 11, 2011 for Chinese Patent Application No. 200510052746.8, a counterpart foreign application of U.S. Appl. No. 10/821,603, 12 pages.

The Japanese Office Action mailed on Jan. 28, 2011 for Japanese Patent Application No. 2005-55981, a counterpart foreign application of U.S. Appl. No. 10/821,603, 8 pages.

Nemoto, "Novelle Announces a Rule for Consolidating Passwords in an Environment Including a Plurality of Servers", retrieved from the internet on Jan. 21, 2011 at http://itpro.nikkeibp.co.jp/free/NT/NEWS/20040318/1, Mar. 18, 2004, 3 pages.

"Novelle Announces Products for Achieving Both Security and Efficiency", retrieved from the internet on Jan. 21, 2011 at http://journal.mycom.co.jp.news/2002/05/20/06.html, May 20, 2002, 1 page.

"Single Sign-ON: Improving Convenience and Reducing Management Burdens for Users in a Secure Sing-ON Environment", retrieved from the internet at http://itpro.nikkeibp.co.jp/as/novell-sec/sp1/index.html, 2003, 7 pages.

Stern, et al., "NFS & NIS", 2nd Ed., O'Reilly Japan, Inc., published on Apr. 27, 2002, pp. 72-77.

Taguchi, "Novell Announces a Network-Security Related New Product Novell SecureLogin 3.0", retrieved from the internet on Jan. 21, 2011 at http://ascii.jp.elem/000/000/331/331049/, May 21, 2002, 14 pages.

"ArcotID Software Smart Card", retrieved on Apr. 21, 2011 from <<http://www.arcot.com/arcotID.html>>, available as early as Apr. 28, 2004, 3 pages.

Cross, "Certificate Autoenrollment in Windows Server 2003", retrieved on Apr. 21, 2011 from <<http://msdn.microsoft.com/en-us/library/bb643324.aspx>>, published Apr. 1, 2003, 29 pages.

"RSA Security Introduces Web-based Digital Credential Store", retrieved on Apr. 21, 2011 from <<http://www.rsa.com/press_release.aspx?id=312>>, published Dec. 11, 2000, 2 pages.

* cited by examiner

| Local / Remote | E and /P | E and P | /E and /P | /E and P |
|---|---|---|---|---|
| E and /P | - | Remote | Remote | Remote |
| E and P | Local | - | Remote | Remote |
| /E and /P | Local | Local | - | Remote |
| /E and P | Local | Local | Local | - |

| Local / Remote | E and /P | E and P | /E and /P | /E and P |
|---|---|---|---|---|
| E and /P | - | Local | Local | Local |
| E and P | Remote | - | Local | Local |
| /E and /P | Remote | Remote | - | Local |
| /E and P | Remote | Remote | Remote | - |

CREDENTIAL ROAMING IN ELECTRONIC COMPUTING SYSTEMS

RELATED APPLICATION

This application is related to co-owned, pending U.S. patent application Ser. No. 10/365,878 of David B. Cross, et al., filed on Feb. 13, 2003 for "Digital Identity Management."

TECHNICAL FIELD

The described subject matter relates to electronic computing, and more particularly to systems and methods of credential roaming in electronic computing systems.

BACKGROUND

Various types of encryption schemes are widely used to secure data (e.g., an email message or file) for communication over a network. For example, in symmetric encryption, both the user that is encrypting data and the user that is decrypting the data need copies of the same encryption key. Asymmetric encryption, also known as public key encryption, uses key pairs (e.g., a public key and a private key). In asymmetric encryption the public keys may be shared but the private keys are not.

Encryption keys may be stored on a computer system, e.g., as part of a user profile or other repository for user settings, credentials, etc. The encryption keys may be modified or replaced over time to decrease the likelihood that unauthorized users are able to decipher the encryption scheme. In any event, the user is provided access to the encryption keys after the user is authenticated (e.g., during logon) and the user profile is loaded on the computer system.

The user may, however, need access to the encryption keys at more than one computer system (e.g., a personal computer and one or more mobile devices). Although the user may transfer the encryption keys from one computer system to another (e.g., using a diskette or other removable storage media), this is cumbersome and time-consuming. While smartcards may be used, these are expensive. Alternatively, the user profile may be stored on a network server and accessed from a variety of different computer systems every time the user connects to the network. However, the user profile may be large (many megabytes) and downloading the user profile from a network server may slow the logon process. In addition, the user may not be able to logon and use the computer without a locally-stored user profile (when the network is not available).

SUMMARY

Implementations are described and claimed herein to enable credential roaming, e.g., among a plurality of different computing devices. An exemplary system may include an event handler which receives event notifications such as, e.g., an interactive or network logon from an operating system. The event handler may invoke a management service in response to receiving an event notification. The management service may include a synchronizing module to synchronize a user's credentials (e.g., encryption credentials) with a remote cache or directory service. Accordingly, the user's credentials are available from any of a number of different computing devices.

In some implementations, articles of manufacture are provided as computer program products. One implementation of a computer program product provides a computer program storage medium readable by a computer system and encoding a computer program for credential roaming. Another implementation of a computer program product may be provided in a computer data signal embodied in a carrier wave by a computing system and encoding the computer program for credential roaming.

The computer program product encodes a computer program for executing a computer process on a computer system to enumerate local credentials and remote credentials in response to receiving an event notification, and synchronizing the local credentials and remote credentials.

In another implementation, a method is provided. An exemplary method includes enumerating local credentials and remote credentials in response to receiving an event notification, and synchronizing the local credentials and remote credentials.

In another implementation, a system is provided. An exemplary system includes an event handler to receive event notifications. A synchronizing module is operatively associated with the event handler. The synchronizing module synchronizes local credentials and remote credentials when the event handler receives an event notification if the local and remote credentials are different from one another.

BRIEF DESCRIPTION OF THE DRAWINGS

FIG. 5 illustrates exemplary winner arbitration matrices, wherein (a) is a lenient matrix and (b) is a strict matrix;

DETAILED DESCRIPTION

Briefly, credential roaming may be implemented to synchronize local credentials (encryption keys, certificates, tokens, etc.) at any number (n) of computing devices. For purposes of illustration, a user may change, modify, add and/or remove credentials at his or her laptop or desktop computer. When the user logs out of the laptop or desktop computer, a management service synchronizes the local credentials with a remote cache. The remote cache may be implemented as a remote directory service, such as, e.g., Active Directory available for the Microsoft WINDOWS® operating environment. Alternatively, the management service may synchronize in response to other events. For example, real-time synchronizing may occur in response to one or more credentials being added, removed and/or modified.

Later, the user may use his or her personal digital assistant (PDA) or mobile phone to retrieve email messages. When the user logs onto the mobile device, the user's credentials are synchronized with the remote directory service so that the user has available a current and complete set of credentials, such as, e.g., encryption credentials for sending/receiving email messages.

In exemplary implementations, the management service may be automatically invoked (e.g., in response to a system event) and no affirmative action is even required of the user. Furthermore, the user profile may be stored locally, e.g., on the user's desktop or laptop computer, while still allowing the user to have access to a current and complete set of credentials at any of a number of different computing devices. Exemplary implementations may also ensure old or unused credentials are removed from the user's system when these credentials are no longer needed (e.g., by detecting and propagating a deletion or examining time-stamps for the credentials).

Exemplary System

Figure 1:
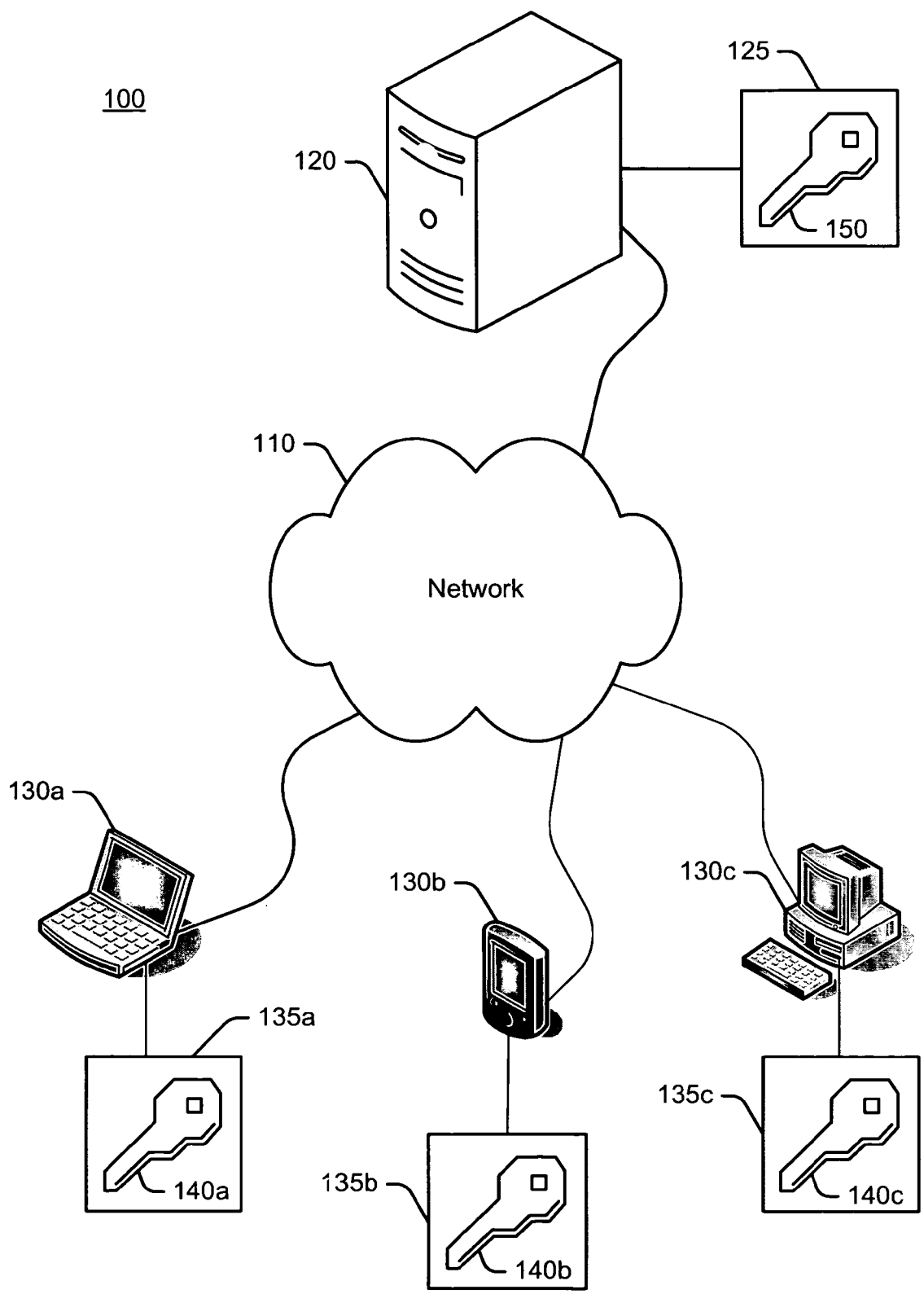
FIG. 1 is a schematic illustration of an exemplary computer network that may implement credential roaming.

FIG. 1 is a schematic illustration of an exemplary networked computing system 100 in which credential roaming may be implemented. The networked computer system 100 may include one or more communication networks 110, such as local area network (LAN) and/or wide area network (WAN). One or more hosts 120 and one or more clients 130a-c may be communicatively coupled over the communication network(s) 110.

Host 120 and clients 130a-c (hereinafter generally referred to as clients 130) may connect to a network via a communication connection such as, e.g., an Ethernet connection. Although there are no theoretical limits on the number of devices that can be included in a network such as networked computing system 100, the number of devices are limited primarily by the connectivity implemented in the communication network.

The terms "host" and "client" both refer to the hardware and software (the entire computer system) used to perform various computing services. For example, a host may be implemented as a server computer that is dedicated to server applications or that also runs other applications. A client may be implemented as a stand-alone desktop or laptop personal computer (PC), workstation, personal digital assistant (PDA), or any of a wide variety of electronic appliances, to name only a few examples.

Credentials 140a-c (hereinafter generally referred to as credentials 140) may be provided at one or more of the clients 130. Credentials may be provided, for example, for symmetric and/or asymmetric encryption/decryption of data for secure communication over network 110, to apply a digital signature to content, or to authenticate to a system, to name only a few examples. Any number of credentials 140 may be stored in a local cache 135a-c (hereinafter generally referred to as local cache 135). Local cache 135 may include a user profile or other repository (e.g., for user settings and credentials) although other implementations are also contemplated.

It is noted that the credentials 140 may include any of a wide variety of different types of credentials, such as, e.g., symmetric encryption keys, asymmetric encryption key pairs, X.509 certificates, XrML licenses, tokens, and authentication/authorization credentials to name only a few exemplary credentials. Of course credentials 140 are not limited to these examples and may include other types of credentials now known or later developed.

Credentials 140 may be added to the local cache 135, for example, to encrypt/decrypt different types of data. In addition, credentials 140 may be modified or replaced, e.g., to decrease the likelihood that unauthorized users are able to decipher the encryption scheme. Credentials that are no longer used may be removed. If one or more credential 140 is added, modified, replaced, or removed at any one of the clients (e.g., 130a), this change may be propagated to one or more other clients (e.g., 130b, 130c) so that a user has available a current and complete set of encryption credentials at any number (n) of different clients, as described in more detail below.

In an exemplary implementation, local credentials 140 may be synchronized with remote credentials 150 provided at a remote cache 125, e.g., at one or more hosts 120 or a shared cache at another client 130 in a workgroup environment. Accordingly, the user has available a current and complete set of credentials when the user logs onto other clients 130.

Remote cache 125 may be implemented as a directory service, such as a distributed lightweight directory access protocol (LDAP) or X.500 directory service. The directory service may be monolithic, or it may be distributed as a multi-master implementation or master-slave implementation. Remote cache 125 may stored in a protected or encrypted state so that the remote credentials 150 are not exposed to compromise, theft, or exploit by unauthorized users.

An exemplary directory service is the Active Directory available with the Microsoft WINDOWS® operating environment. Active Directory is a directory service that may be deployed in distributed computing environments to provide comprehensive directory services. Active Directory serves as a consolidation point for isolating, migrating, centrally managing, and reducing the number of directories that an enterprise needs. Active Directory also serves as a central authority (CA) for network security.

It is noted, however, that remote cache 125 may be implemented in any suitable manner and is not limited to the examples given herein.

Figure 2:
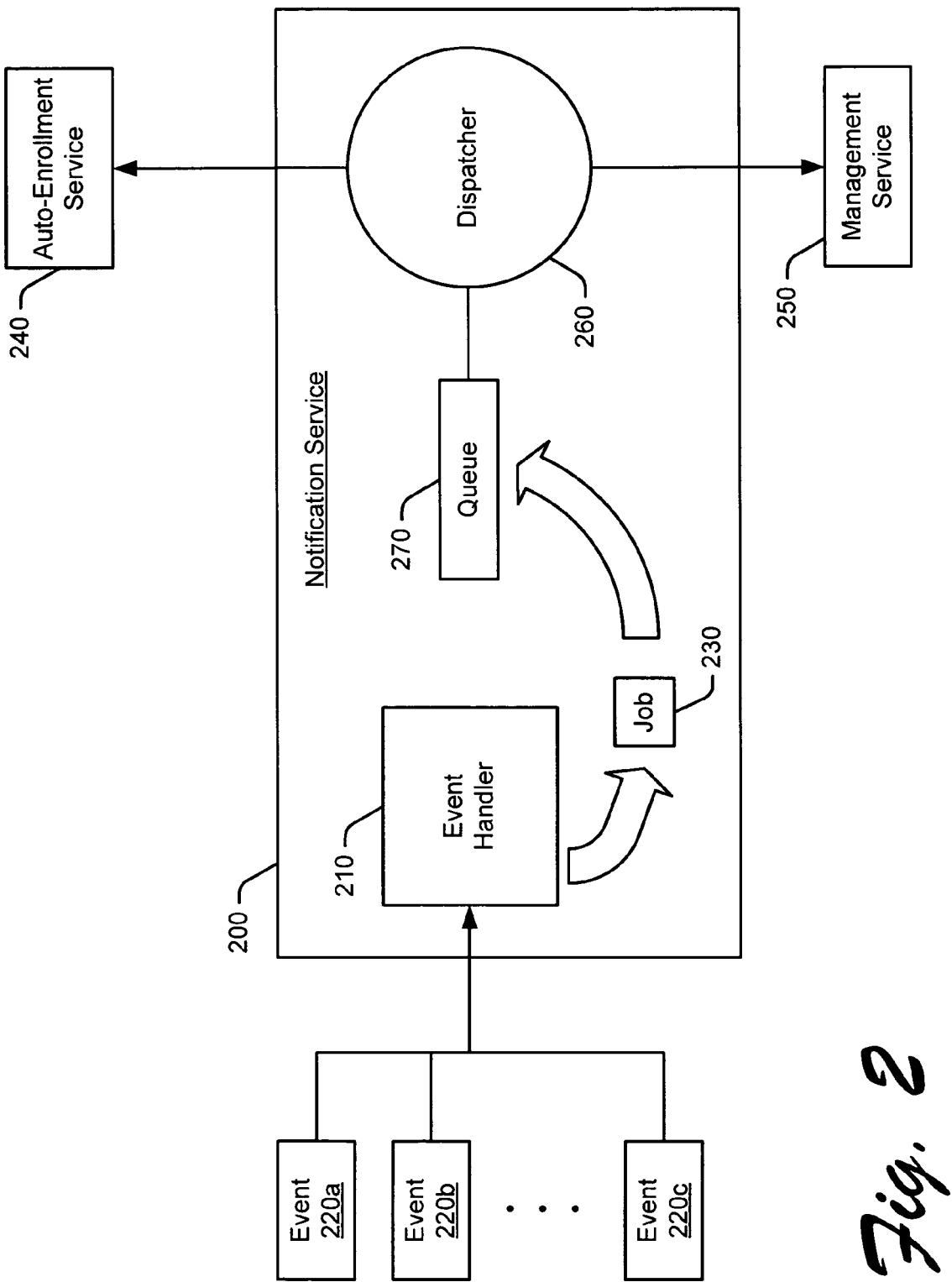
FIG. 2 is a functional block diagram of exemplary modules to implement credential roaming.

FIG. 2 is a functional block diagram of exemplary modules to implement credential roaming, e.g., using a notification service. Notification service 200 may be implemented in computer-readable program code (e.g., software and/or firmware) stored in computer-readable storage or memory and executable by a processor (or processing units) at one or more clients (e.g., the clients 130a-c in FIG. 1). Notification service 200 receives notification of various system events and invokes a management service 250 to synchronize local and remote credentials for a user. Accordingly, synchronization may be automatic and transparent to the user.

Referring to FIG. 2, notification service 200 may include an event handler 210. Event handler 210 receives notification of events 220a-c (hereinafter generally referred to as events 220). Events 220 may include, by way of example, startup, shutdown, logon, logoff, lock, unlock, to name only a few exemplary events. Other events may also include, but are not limited to session events (e.g., policy update, running a process, network connection), and timer events (e.g., every 8 hours, once a month). Optionally, an event may also be triggered manually, e.g., by the user requesting credential synchronization.

Event handler 210 may generate one or more jobs 230 based at least in part on events 220. Jobs 230 may include calls to other services. For example, a job 230 may call an auto-enrollment service 240. Auto-enrollment is a service that may be used to populate a user profile with credentials, etc., and may be invoked when a user is new to the system (e.g., a guest) to provide limited functionality and access to basic resources without compromising network security. Auto Enrollment automatically "enrolls" a user by requests/renewing the credentials for a user, e.g., based on the system policies for the computing environment. A job 230 may also call a management service 250 to synchronize encryption credentials with a remote cache (e.g., the remote cache 125 in FIG. 1), as discussed in more detail below.

Jobs 230 may be passed to a dispatcher 260. Job dispatcher 260 may remove jobs 230 from the queue and process jobs 230 in a serialized manner. The job dispatcher 260 determines which program code (or modules) to load for processing the job and when to load the program code. The job dispatcher 260 may also unload program code that is no longer being used.

Notification service 200 may also include logic for intelligently managing jobs 230 to reduce unnecessary resource consumption. In an exemplary implementation, job dispatcher 260 determines whether program code (or modules) for processing the job 230 is already loaded. In addition, if the job queue 270 is empty (e.g., there are no pending jobs 230), the job dispatcher 260 releases loaded program code (or modules).

In another exemplary implementation, event handler 210 may order jobs 230 that invoke the management service 250 in the queue 270 ahead of jobs 230 that invoke the auto-enrollment service 240. When events 220 trigger jobs 230 to call both the auto-enrollment service 240 and the management service 250, the jobs 230 invoking the auto-enrollment service 240 may be removed from the queue 270 if the management service is able to provide credentials for a user during synchronization.

In another exemplary implementation, dampening logic may be implemented to reduce repeated calls to the management service 250 (e.g., when an event 220 triggers other events). For example, dispatcher 260 may examine the job queue 270 and discard any jobs 230 which are duplicative or otherwise unnecessary.

Before continuing, it is noted that the notification service 200 is not limited to the exemplary modules shown in FIG. 2. For example, the functions do not need to be embodied in separate modules. In yet other implementations, additional functional components may also be included. Regardless of the implementation, notification service may call management service 250 to synchronize local and remote credentials.

Figure 3:
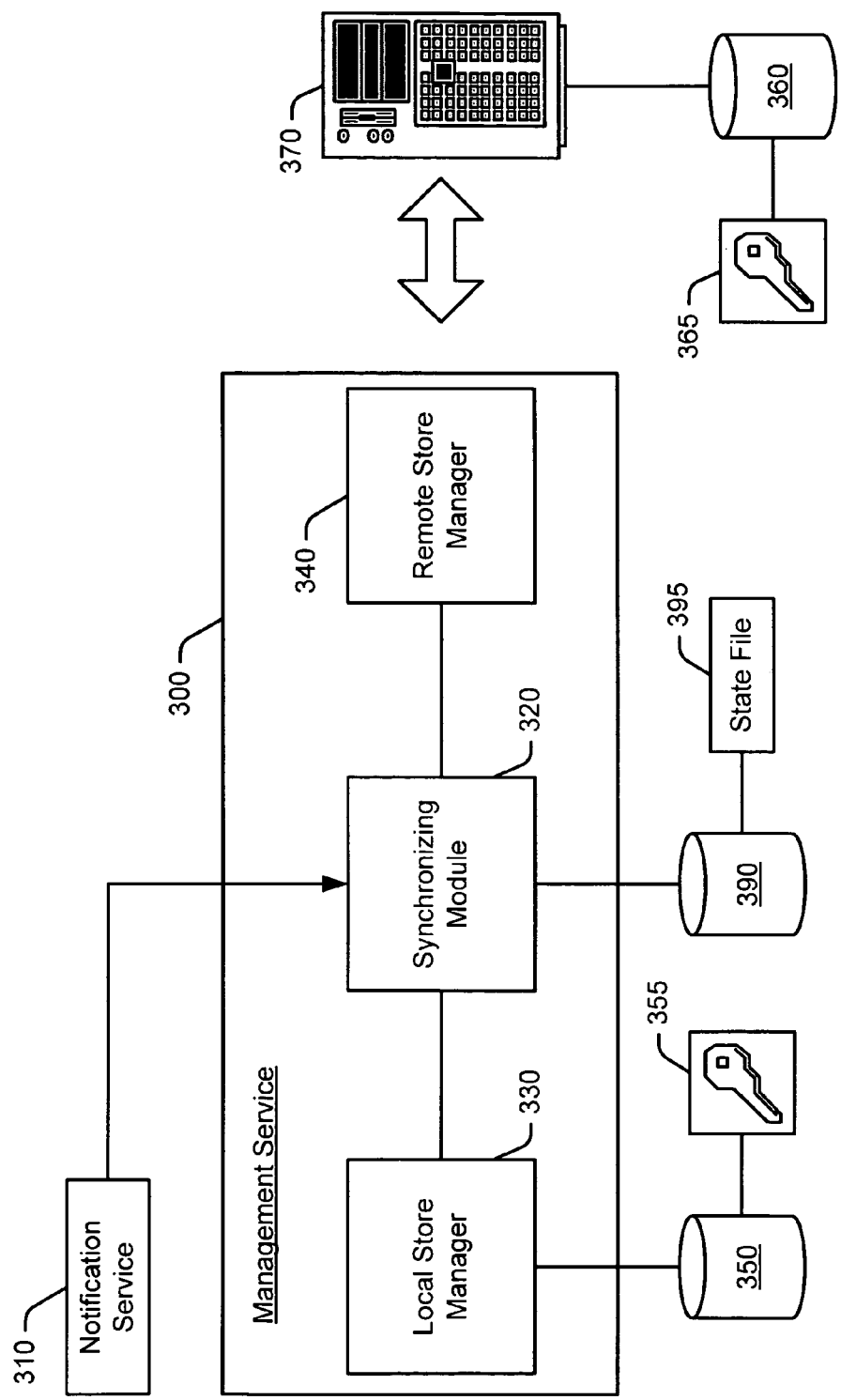
FIG. 3 is another functional block diagram of exemplary modules to implement credential roaming.

FIG. 3 is a functional block diagram of exemplary modules to implement credential roaming, e.g., using a management service. Management service 300 may be operatively associated with a notification service 310 (e.g., the notification service described in more detail above with reference to FIG. 2). Notification service 310 may invoke management service 300 in response to receiving notification of an event. Management service 300 evaluates and compares local credentials and remote credentials and, if these are different, synchronizes the local and remote credentials so that the user has available a current and complete set of credentials when using any number (n) of different clients.

Management service 300 may be implemented in computer-readable program code (e.g., software and/or firmware) stored in computer-readable storage or memory and executable by a processor (or processing units) at one or more clients (e.g., the clients 130a-c in FIG. 1). Management service 300 may include a synchronizing module 320 to evaluate credentials, resolve conflict(s), and update the credentials at the local and remote caches.

Synchronizing module 320 may be operatively associated with local store manager 330 and remote store manager 340. Local store manager 330 may be operatively associated with one or more local cache 350 for local credentials 355. In addition, local store manager 330 may abstract the procedures to load/save local encryption credentials 355 locally. Remote store manager 340 may be operatively associated with a remote cache 360 (e.g., a directory service) provided via one or more server computers or hosts 370. Remote store manager 340 may also securely bind to the host 370 to access one or more remote credentials 365 via the remote directory service 360, e.g., during synchronizing.

Before continuing, it is noted that credentials are not limited to being provided at a host, e.g., via a remote directory service. In another exemplary implementation the remote cache may be a shared cache at another client, e.g., in a workgroup environment. Accordingly, clients in one or more workgroups may synchronize shared credentials among clients in the workgroup.

The store managers 330, 340 may enumerate credentials 355, 365 (e.g., as a list of roaming credentials) for the synchronizing module 320 to evaluate. The store managers 330, 340 may also provide information to the synchronizing module 320, such as, e.g., the last time the collections of credentials 355, 365 were changed so that the synchronizing module 320 can resolve any conflict(s).

Synchronizing module 320 may operate in conjunction with local store manager 330 and remote store manager 340 to synchronize local encryption credentials 355 and remote encryption credentials 365. For many invocations, there may be no changes to either the local or remote encryption credentials. During other invocations, changes may only need to be made to the local credentials 355 or only to the remote credentials 365. However, there may also be circumstances where may need to be made to both the local credentials 355 and the remote credentials 365. Accordingly, synchronizing module may be implemented to handle each of these scenarios.

Evaluating local and remote encryption credentials may be a time-consuming process, particularly if there are several hundred or even several thousand encryption credentials. Accordingly, synchronizing module 320 may first sort the encryption credentials into arrays and then make a linear comparison of the sorted arrays. Of course other implementations are also contemplated, such as but not limited to using a hash and timestamp to determine if there is a change.

During the comparison, synchronizing module 320 may encounter conflicts that need to be resolved in order to synchronize the local and remote credentials 355, 365. For example, a local credential (referred to as an "old credential" for purposes of illustration) may be modified or removed/deleted from the local cache 350 because it is no longer needed. When synchronizing module 320 compares the local and remote credentials 355, 365, however, the remote credentials may still include the old credential. Synchronizing module 320 resolves such a conflict so that the old credential is modified or removed from the remote cache 360 and not rewritten to the local cache 350.

In an exemplary implementation, credentials that have been modified or removed/deleted are "tagged" or otherwise identified in the remote cache. Accordingly, the modify or delete operation may be persisted across multiple clients. As an example, if the old credential is deleted from a first client, synchronizing module 320 identifies the old credential at the remote cache as having been removed or deleted. When a second client also having a copy of the old credential synchronizes with the remote cache, the old credential is deleted from the second client and not rewritten to the remote cache. As another example, if the old credential is modified at a first client, synchronizing module 320 identifies the old credential at the remote cache as having been modified. When a second client also having a copy of the old credential synchronizes with the remote cache, the old credential is modified at the second client and not returned to its original condition at the remote cache.

In an exemplary implementation, synchronizing module 320 maintains one or more state files 395 for conflict resolution. The state file is a per-user persisted data structure (e.g., computer file, database, memory table, log, etc.) and may be used to store the state of local credentials 350. The state file may be stored locally, e.g., in cache 390 operatively associated with the management service 300. In an exemplary implementation, all fields may be stored in binary, native byte-order, although other implementations are also contemplated.

Figure 4A:
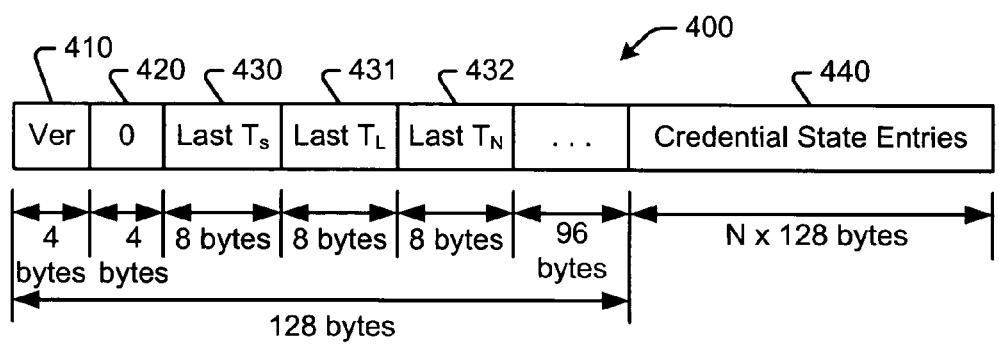
FIG. 4a illustrates an exemplary state file.

FIG. 4a illustrates an exemplary state file 400 (e.g., a data structure). State file 400 may include a file version 410 and a flag 420. Flag 420 may be used, e.g., to indicate whether the credential is user-protected or can be exchanged on the network. Alternatively, flag 420 (or another flag) may be used to indicate whether a strict or lenient matrix should be used to resolve conflicts.

State file 400 may also include one or more credential states 430-432. For example, state file 400 may include the following states: last time synchronization module called ($T_S$); last time local store changed ($T_L$), last time when the remote cache changed ($T_R$). The state file may also include credential state entries 440.

Figure 4B:
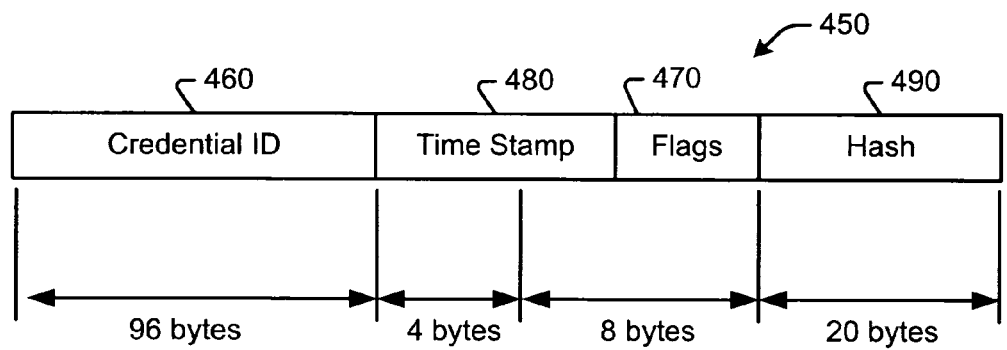
FIG. 4b illustrates an exemplary state entry in a state file.

FIG. 4b illustrates an exemplary state entry 450 (e.g., a data structure). State entry 450 may include a list of local states for each credential. Local states may include credential ID 460, flags 470, time-stamp 480, and hash 490.

Before continuing, it is noted that the time-stamp is not limited to a clock-based (e.g., physical or system) time. For example, the time-stamp may include counters such as an update sequence number which is changed for every update made. Indeed, a clock-based time-stamp may be used for the local cache and an update sequence number-based time-stamp may be used for the remote cache.

In the implementation shown in FIG. 4, credential ID 460 is the "compressed" path of the encryption credential file. Credential ID 460 may be expressed as a single-byte ASCII string, although other implementations are also contemplated. In addition, any suitable flags 470 may be defined and may be set (e.g., 1) or off (e.g., 0). For example, a flag may indicate whether the encryption credential is roaming (can be synchronized) or fixed (should not be synchronized).

Operations that may be implemented for conflict resolution using state files, such as the state file 400 shown in FIG. 4, are described in more detail below. Conflict resolution may be illustrated by arbitration matrices.

FIGS. 5a and 5b illustrate exemplary arbitration matrices, wherein the matrix 500 is lenient and the matrix 550 is strict. In the matrices 500, 550, exportable credentials are denoted by the letter "E" and protected (or non-exportable) credentials are denoted by the letter "P", wherein "/E" and "/P" denote opposites. The time-stamps of both the certificates are used to determine which certificate is the most recent. The most recent certificate is used to overwrite the local and remote cache. The other certificate is deleted.

It is noted that the exemplary implementations discussed above are provided for purposes of illustration. Still other implementations are also contemplated.

Exemplary Operations

Described herein are exemplary methods for implementing encryption credential roaming. The methods described herein may be embodied as logic instructions on one or more computer-readable medium. When executed on a processor, the logic instructions cause a general purpose computing device to be programmed as a special-purpose machine that implements the described methods. In the following exemplary operations, the components and connections depicted in the figures may be used to implement encryption credential roaming.

Figure 6:
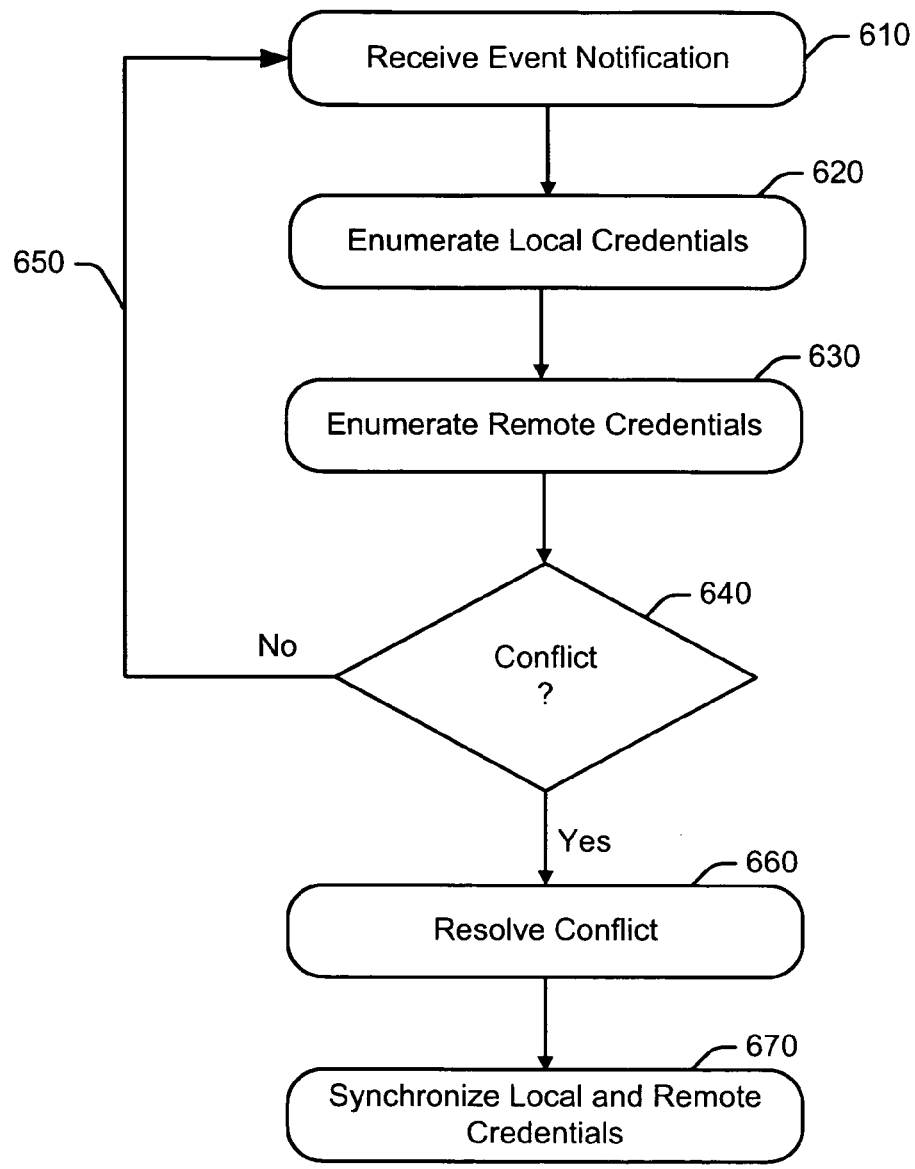
FIG. 6 is a flowchart illustrating exemplary operations to implement credential roaming.

FIG. 6 is a flowchart illustrating exemplary operations that may be implemented for encryption credential roaming. In operation 610, the client may receive an event notification. Event notifications may include, by way of example, a session event, a logon event, a logout event, a lock event, an unlock event, a timer event, a policy application event, and/or a credential update event. In operation 620 local credentials may be enumerated and in operation 630 remote credentials may be enumerated.

In operation 640, the local credentials and remote credentials may be compared to determine if there is a conflict. If there is no conflict, operations return as illustrated by arrow 650 to operation 610. Alternatively, a conflict may exist if any one or more of the enumerated local credentials are different than the enumerated remote credentials. For purposes of illustration, the enumerated local credentials may be different than the enumerated remote credentials if a credential has been added, modified, or deleted from a local credential cache and/or a remote credential cache.

If a conflict exists, the conflict is resolved in operation 660, e.g., by determining which credentials need to be added/removed in the local and remote credential caches. In an exemplary implementation, the conflict may be resolved based on time-stamps associated with the local and remote credentials. In operation 670, local and/or remote credentials are synchronized, e.g., so that both the local and remote credential caches include a complete, updated set of encryption credentials.

For purposes of illustration, operation 660 (conflict resolution) and operation 670 (synchronization) may be implemented as follows:

When credential roaming is first enabled for a client, the client may already have the same credentials (e.g. via manual key or PKCS #12 blob import) as in the remote cache. However, the credential storage and linker details may be different depending on how the credential was imported. This initial conflict may be resolved as follows.

If the remote credentials have already been downloaded, master keys (e.g., for accessing private keys) may be synchronized before these operations are performed so that private keys that need master keys are available.

A management service may then retrieve the creation time of the remote cache, e.g., via attribute's meta-data, and assigns it to $T_C$. If either or both of the time-stamps for the conflicting certificates are newer than $T_C$, at least one of the certificates was modified after deployment of credential roaming and the most recent cache is used.

Otherwise, both the local and remote caches may have been created before the deployment of credential roaming. The information flags for both certificates are retrieved to determine if the credential is user-protected or exportable. The policy flag may also be retrieved and determined whether a lenient matrix (e.g., matrix 500 in FIG. 5) or strict matrix (e.g., matrix 550 in FIG. 5) should be used to resolve the conflict.

An exemplary implementation of an algorithm for credential roaming is described as follows. According to this implementation, $T_L$ represents the most recent time the entire local cache changed. $T_L$ is based on the local machine's system time and may be compared with the local cache's update time so there is no timer skew. $T_R$ represents the most recent time changes were made to the Update Sequence Number (USN) of the entire remote cache at the last synchronization. $T_R$ may use the USN from the remote cache and may be compared with the remote cache USN so there is no timer skew.

First, the current last change time is read from the local cache and the USN is read from the remote cache. Then $T_L$ and $T_R$ are read from the state file header. $T_L$ is compared with the last change time just read from the local cache and $T_R$ is compared with the USN read from the remote cache. If they are both equal, nothing needs to be done. Otherwise, the algorithm may create a local change list $C_L$ and a remote change list $C_R$, both initially empty.

If the last time the local cache was changed is later than $T_L$, the all the local cache credentials are read and compared with a corresponding entry in the state file. If any of the credentials are different, an entry may be created in $C_L$ recording the credential or the state file entry, the most recent time a credential was updated, and a suggested action (e.g., add to the remote/local cache, modify the corresponding remote/local cache credential, delete the corresponding remote/local cache credential, update state file entry, etc.). Credentials may be deemed to be different if the hash value has changed, if the flag value has changed (e.g., to DELETED, UNWRITEABLE, UNREADABLE), or if the local cache has a credential that the state file does not have a record of, or state file has an entry that local cache does not have a record of.

If the remote cache's last USN is different than $T_R$, all of the remote cache credentials are read and the same operations as just described are performed. The change list $C_R$ may also be updated.

Both the $C_L$ and $C_R$ may then be evaluated to determine if actions have been performed on the same credential in both lists. If actions have been performed on the same credential in both lists, these actions may be evaluated to determine if there are any conflicts. For example, there may be a conflict if $C_L$ includes an entry for credential A to "modify remote" while $C_R$ includes an entry for the same credential to "modify local." The conflict may be resolved based on the last change times of both the local and remote credentials. That is, the entry with the earlier change time may be deleted from the list.

After resolving the conflicts, if any, the local and remote cache are updated based on the union of $C_L$ and $C_R$. A flag is set for each entry that failed to update even after a few retries.

The state file may then be updated. For example, DELETED flags that have been set for an excessively long time may be identified and removed. The state file header and entries may also be updated based on the resultant $C_L$ and $C_R$ entries. If the state file failed to update even after a few retries, credential roaming may be disabled because a corrupted state file may generate unpredictable results.

It is noted that the entries described above may be evaluated as hash values. Hash values provide security, e.g., so that credentials are not duplicated in unnecessary caches, and for performance (hash comparisons are typically fast). However, it is noted that using a hash is only exemplary. For example, if the state file stores the entire credential, it may be used for binary or exact comparison in place of a hash.

The last sync time $T_S$ maintained in the state file may be used to determine how to handle the local cache entry that exists in the state file but not in the remote cache. If the time elapsed from $T_S$ until the current time is less than a threshold time, then the remote cache adds this entry. Otherwise the entry may be deleted from the local cache.

Error conditions in synchronizing the credentials may also result in partially updated or corrupted credentials. Accordingly, error handling may be provided so that a failure is not propagated, e.g., to the remote cache.

In any exemplary implementation, a "Write State" is returned to indicate a completion status of the write operation. The values may be: NONE, PARTIAL and DONE to indicate that the credential is (1) not altered, (2) partially changed or (3) successfully changed, respectfully. If a save operation results in a PARTIAL write state, the state file entry is marked as UNWRITEABLE. If a delete operation results in a NONE or PARTIAL write state, the state file entry is marked as UNWRITEABLE. For any sporadic write or delete failures, write or delete operations may be retired and the state file entry may be marked when all tries for a credential have failed.

The synchronization ignores the local change if it is marked as UNWRITEABLE and may retry deleting the local credential if it is marked UNWRITEABLE. If the credential is successfully overwritten when it is marked as UNWRITEABLE, or if it disappeared when state file marks it as UNWRITEABLE, the UNWRITEABLE flag may be cleared from the state file entry.

If State file fails to update (e.g., indicating a potentially corrupted state file), the credential roaming may be disabled for the failed client or for a particular user. It may be manually re-enabled if the problem is fixed later. The system may also perform automatic recovery steps to override any bad data by downloading known good data from the remote store at the next invocation interval.

Local cache read failures may also be handled. The read failures may be handled more leniently than update failures so that a read failure of a roaming credential does not affect the roaming for other credentials.

In an exemplary implementation, a credential having a read failure appears in the roaming credential set returned by a GET ALL operation so that synchronization does not treat it as a deletion. Local cache reads may be retried with delay when any failure occurs. If the failure still exists after a number of retries, a roaming credential is nevertheless generated with the UNREADABLE flag bit set. Informational, warning, and/or error events may be traced or logged to facilitate trouble shooting/maintenance.

The operations shown and described herein are merely illustrative of an exemplary implementation of credential roaming. It is noted that the operations are not limited to any particular order. In FIG. 6 for example, operation 620 may occur before, after, or simultaneously with operation 630. In another example, operations 620-670 may be iterative for individual encryption credentials, different types of encryption credentials, or other groupings (or sets) of encryption credentials. Still other operations may also be implemented to enable credential roaming.

Exemplary Computing Device

Figure 7:
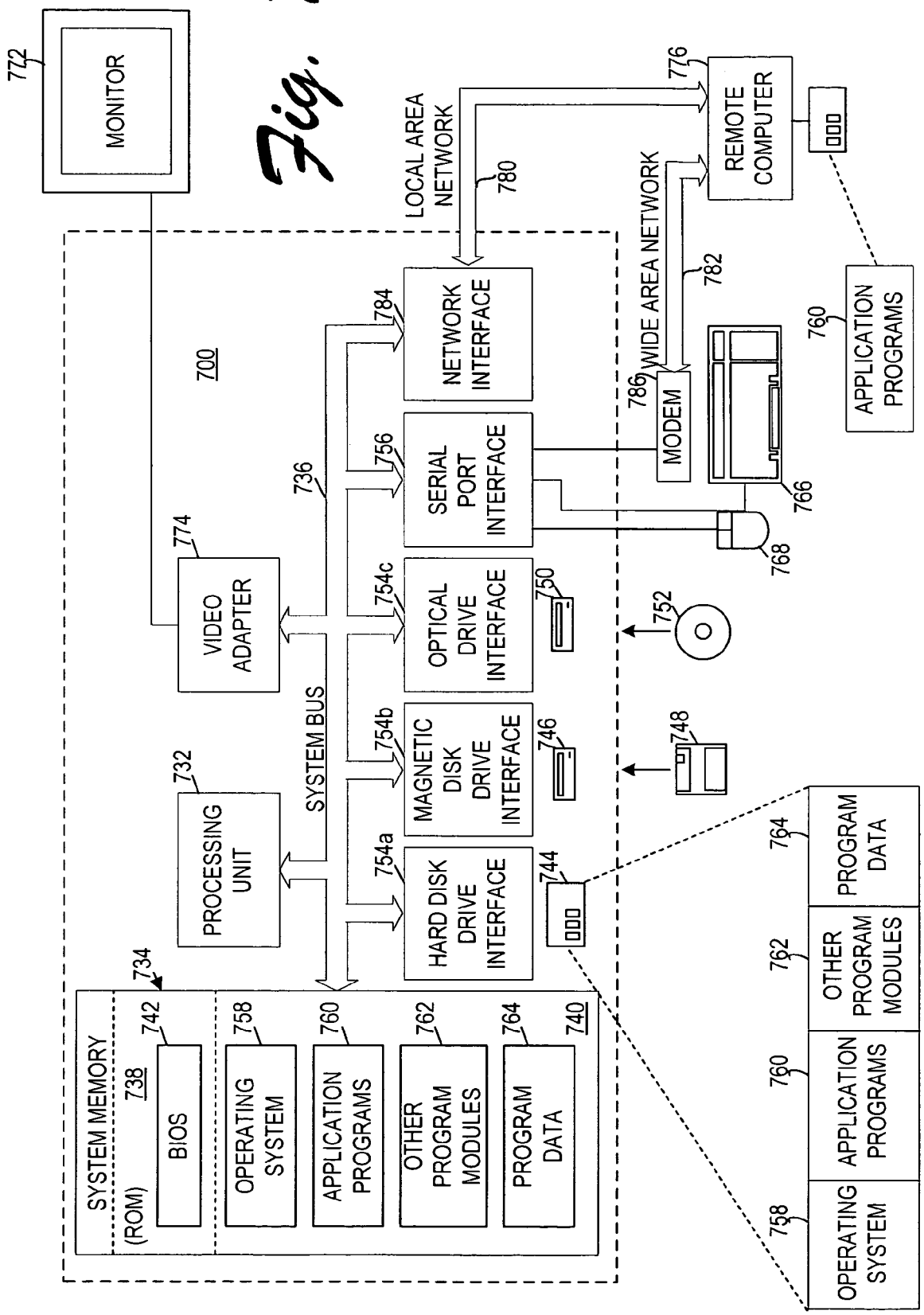
FIG. 7 is a schematic illustration of an exemplary computing device that can be utilized to implement credential roaming.

FIG. 7 is a schematic illustration of an exemplary computing device 700 that can be utilized to implement credential roaming. Computing device 700 includes one or more processors or processing units 732, a system memory 734, and a bus 736 that couples various system components including the system memory 734 to processors 732. The bus 736 represents one or more of any of several types of bus structures, including a memory bus or memory controller, a peripheral bus, an accelerated graphics port, and a processor or local bus using any of a variety of bus architectures. The system memory 734 includes read only memory (ROM) 738 and random access memory (RAM) 740. A basic input/output system (BIOS) 742, containing the basic routines that help to transfer information between elements within computing device 700, such as during start-up, is stored in ROM 738.

Computing device 700 further includes a hard disk drive 744 for reading from and writing to a hard disk (not shown), and may include a magnetic disk drive 746 for reading from and writing to a removable magnetic disk 748, and an optical disk drive 750 for reading from or writing to a removable optical disk 752 such as a CD ROM or other optical media.

The hard disk drive 744, magnetic disk drive 746, and optical disk drive 750 are connected to the bus 736 by appropriate interfaces 754a, 754b, and 754c. The drives and their associated computer-readable media provide nonvolatile storage of computer-readable instructions, data structures, program modules and other data for computing device 700. Although the exemplary environment described herein employs a hard disk, a removable magnetic disk 748 and a removable optical disk 752, other types of computer-readable media such as magnetic cassettes, flash memory cards, digital video disks, random access memories (RAMs), read only memories (ROMs), and the like, may also be used in the exemplary operating environment.

A number of program modules may be stored on the hard disk 744, magnetic disk 748, optical disk 752, ROM 738, or RAM 740, including an operating system 758, one or more application programs 760, other program into computing device 700 through input devices such as a keyboard 766 and a pointing device 768. Other input devices (not shown) may include a microphone, joystick, game pad, satellite dish, scanner, or the like. These and other input devices are connected to the processing unit 732 through an interface 756 that is coupled to the bus 736. A monitor 772 or other type of display device is also connected to the bus 736 via an interface, such as a video adapter 774.

Generally, the data processors of computing device 700 are programmed by means of instructions stored at different times in the various computer-readable storage media of the computer. Programs and operating systems may be distributed, for example, on floppy disks, CD-ROMs, or electronically, and are installed or loaded into the secondary memory of a computer. At execution, the programs are loaded at least partially into the computer's primary electronic memory.

Computing device 700 may operate in a networked environment using logical connections to one or more remote computers, such as a remote computer 776. The remote computer 776 may be a personal computer, a server, a router, a network PC, a peer device or other common network node, and typically includes many or all of the elements described above relative to computing device 700. The logical connections depicted in FIG. 7 include a LAN 780 and a WAN 782.

When used in a LAN networking environment, computing device 700 is connected to the local network 780 through a network interface or adapter 784. When used in a WAN networking environment, computing device 700 typically includes a modem 786 or other means for establishing communications over the wide area network 782, such as the Internet. The modem 786, which may be internal or external, is connected to the bus 736 via a serial port interface 756. In a networked environment, program modules depicted relative to the computing device 700, or portions thereof, may be stored in the remote memory storage device. It will be appreciated that the network connections shown are exemplary and other means of establishing a communications link between the computers may be used.

Hosts may include host adapter hardware and software to enable a connection to the communication network. The connection to communication network may be through an optical coupling or more conventional conductive cabling depending on the bandwidth requirements. A host adapter may be implemented as a plug-in card on computing device 700. Hosts may implement any number of host adapters to provide as many connections to communication network as the hardware and software support.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed is:

1. A method comprising:
   storing, in a memory, instructions for performing the method;
   executing the instructions on a processor;
   according to the instructions being executed:
      enumerating local credentials and remote credentials in response to receiving a first event notification, wherein the first event notification comprises a lock event
      enumerating the local credentials and the remote credentials in response to receiving a second event notification, wherein the second event notification is different from the first event notification and comprises a startup event;
      enumerating the local credentials and the remote credentials in response to receiving a third event notification, wherein the third event notification is different from the first and second event notifications and comprises a shutdown event;
      enumerating the local credentials and the remote credentials in response to receiving a fourth event notification, wherein the fourth event notification is different from the first, second, and third event notifications and comprises a logon event;
      enumerating the local credentials and the remote credentials in response to receiving a fifth event notification, wherein the fifth event notification is different from the first, second, third, and fourth event notifications and comprises a logoff event;
      enumerating the local credentials and the remote credentials in response to receiving a sixth event notification, wherein the sixth event notification is different from the first, second third, fourth, and fifth even notifications and comprises a unlock event;
      enumerating the local credentials and the remote credentials in response to receiving a seventh event notification, wherein the seventh event notification is different from the first, second, third, fourth, fifth, and sixth event notifications and comprises a session event;
      enumerating the local credentials and the remote credentials in response to receiving an eighth event notification, wherein the eighth event notification is different from the first, second, third, fourth, fifth, sixth, and seventh event notifications and comprises a timer event;
      enumerating the local credentials and the remote credentials in response to receiving a ninth event notification, wherein the ninth event notification is different from the first, second, third, fourth, fifth, sixth, seventh, and eighth event notifications and comprises a manual request; and
      enumerating the local credentials and the remote credentials in response to receiving a tenth event notification, wherein the tenth event notification is different from the first, second, third, fourth, fifth, sixth, seventh, eighth, and ninth event notifications and comprises a credential update event;
      based on the enumerating, evaluating the local credentials and the remote credentials; and
      based on the evaluating, synchronizing the local credentials and remote credentials.

2. The method of claim 1, wherein synchronizing the local credentials and the remote credentials is based on at least one time-stamp associated with the local credentials and at least one time-stamp associated with the remote credentials.

3. The method of claim 1, wherein synchronizing the local credentials and the remote credentials is based on a comparison of hash values.

4. The method of claim 1, wherein synchronizing includes error handling.

5. The method of claim 1, wherein synchronizing includes writing at least one of the local credentials to a remote credential cache.

6. The method of claim 1, wherein synchronizing includes writing at least one of the remote credentials to a local credential cache.

7. The method of claim 1, wherein synchronizing includes deleting at least one of the local credentials from a local credential cache.

8. The method of claim 1, wherein synchronizing includes deleting at least one of the remote credentials from a remote credential cache.

9. The method of claim 1, wherein synchronizing includes modifying at least one of the local credentials at a local credential cache based on at least one of the remote credentials.

10. The method of claim 1, wherein synchronizing includes modifying at least one of the remote credentials at a remote credential cache based on at least one of the local credentials.

11. The method of claim 1, further comprising updating a list of local credentials.

12. The method of claim 1, further comprising updating a list of remote credentials.

13. The method of claim 1, further comprising determining a state of the remote credentials dynamically.

14. The method of claim 1, further comprising maintaining a state file for the remote credentials.

15. The method of claim 1, further comprising maintaining a state file for the local credentials.

16. The method of claim 1, further comprising resolving a conflict of state between the local credentials and the remote credentials.

17. The method of claim 1, wherein the session event comprises at least one of:
    a policy update;
    running a process; and
    connecting to a network.

18. A computer readable storage memory encoded with a computer program for executing on a computer system a computer process, the computer process comprising:
    enumerating local credentials and remote credentials in response to receiving each of a lock event, a startup event, a shutdown event, a logon event, a logoff event, an unlock event, a session event, a timer event, a manual request, and a credential update event, wherein one of the local credentials and the remote credentials comprises at least one of the following:
        a token; and
        an XrML license;
    evaluating the local credentials and the remote credentials based on the enumerating;
    synchronizing the local credentials and remote credentials based on the evaluating via a synchronizing module, wherein the synchronizing module:
        sorts the local credentials and the remote credentials into a local credential array and a remote credential array respectively and compares the local credential array and the remote credential array; and
        stores a state file for conflict resolution, the state file comprising:
            a file version;
            a flag, wherein the flag indicates whether the credential is user-protected; and
            a credential state, wherein the credential state comprises:
                last time synchronization module called;
                last time local store changed; and
                last time remote cache changed;
        based on the synchronizing module comparing the local credential array and the remote credential array, removing at least one of the local credentials from a first local credential cache associated with a first device, wherein the credential removed from the first local credential cache is identified and tagged by the synchronization module in a remote credential cache;
        based on the synchronizing module comparing the local credential array and the remote credential array, removing the tagged credential from a second local credential cache associated with a second device, wherein the first device is different than the second device, without rewriting the tagged credential to the remote credential cache; and
    handling errors, wherein error handling comprises returning a write state indication of a status of a credential write operation, wherein the write state indication consists of one of the following:
        a none indication, wherein the none indication comprises an indication that the credential was not altered;
        a partial indication, wherein the partial indication comprises an indication that the credential was partially altered; or
        a done indication, wherein the done indication comprises an indication that the credential was successfully changed.

19. The computer readable storage memory of claim 18 wherein the computer process further comprises synchronizing the local credentials and the remote credentials is based on at least one time-stamp associated with the local credentials and at least one time-stamp associated with the remote credentials.

20. The computer readable storage memory of claim 18 wherein the computer process further comprises synchronizing the local credentials and the remote credentials is based on a comparison of hash values.

21. The computer readable storage memory of claim 18 wherein the computer process further comprises writing at least one of the local credentials to a remote credential cache.

22. The computer readable storage memory of claim 18 wherein the computer process further comprises writing at least one of the remote credentials to a local credential cache.

23. The computer readable storage memory of claim 18 wherein the computer process further comprises removing at least one of the local credentials from a local credential cache.

24. The computer readable storage memory of claim 18 wherein the computer process further comprises removing at least one of the remote credentials from a remote credential cache.

25. The computer readable storage memory of claim 18 wherein the computer process further comprises modifying at least one of the local credentials at a local credential cache.

26. The computer readable storage memory of claim 18 wherein the computer process further comprises modifying at least one of the remote credentials at a remote credential cache.

27. The computer readable storage memory of claim 18 wherein the computer process further comprises updating the array of local credentials.

28. The computer readable storage memory of claim 18 wherein the computer process further comprises updating the array of remote credentials.

29. The computer readable storage memory of claim 18 wherein the computer process further comprises determining a state of the remote credentials dynamically.

30. The computer readable storage memory of claim 18 wherein the computer process further comprises resolving a conflict of state between the local credentials and the remote credentials.

31. A system comprising:
   an event handler to receive event notifications;
   a local store manager and a remote store manager to enumerate local credentials and remote credentials in response to receiving an event notification for each of a lock event, a startup event, a shutdown event, a logon event, a logoff event, an unlock event, a session event, a timer event, a manual request, and a credential update event;
   a management service to evaluate the local credentials and the remote credentials based on the enumerating, and
   a synchronizing module operatively associated with the event handle, the synchronizing module implemented in computer-readable program code and executable by a processor to synchronize the local credentials and the remote credentials based on the evaluating when the event handler receives any one of the event notifications and if the local and remote credentials are different from one another.

32. The system of claim 31, wherein the local credentials and the remote credentials include at least one of the following: an encryption credential, a token, an asymmetric key pair, a symmetric key, a digital certificate, an XrML license, an authentication credential, an authorization credential.

33. The system of claim 31, wherein the local credentials are stored in a local cache.

34. The system of claim 31, wherein the local credentials are stored in a local cache provided at any number (n) of clients.

35. The system of claim 31, wherein the local credentials are encrypted using a master key.

36. The system of claim 31, wherein the remote credentials are stored in a remote cache.

37. The system of claim 31, wherein the local credentials are stored in a remote cache provided at any number (n) of hosts.

38. The system of claim 31, wherein the remote credentials are maintained by a remote directory service.

39. The system of claim 31, wherein the remote credentials are encrypted.

* * * * *